(No Model.)
J. E. SHAFFER.
ROTARY ADJUSTABLE STOVE PIPE THIMBLE.
No. 412,673.  Patented Oct. 8, 1889.
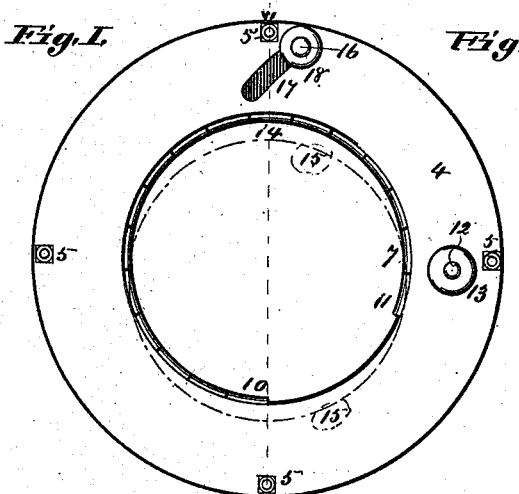
Fig. I.
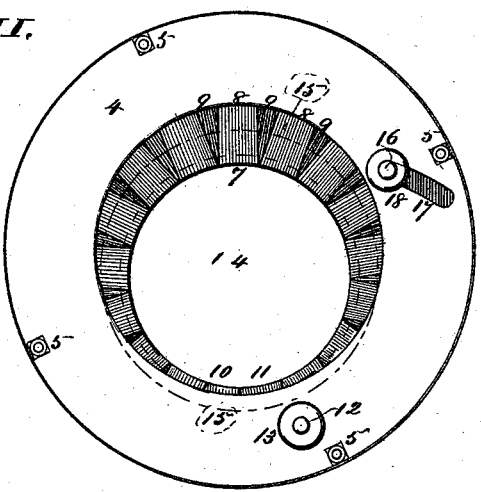
Fig. II.
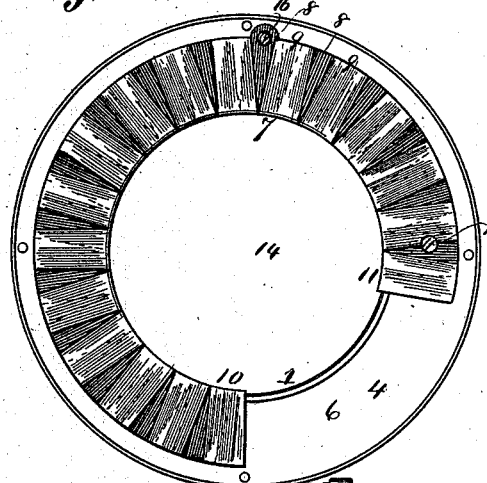
Fig. III.
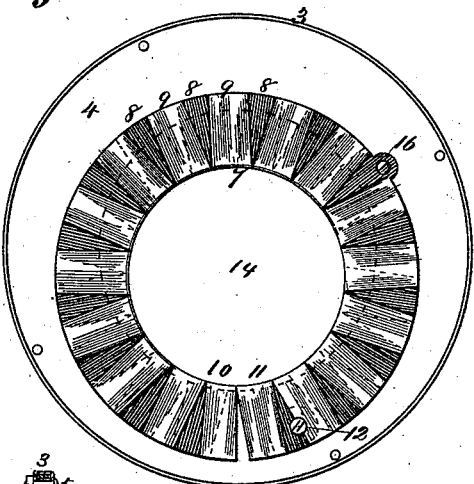
Fig. IV.
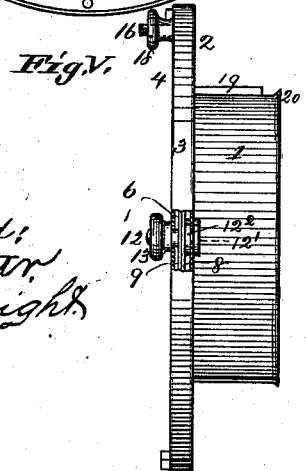
Fig. V.
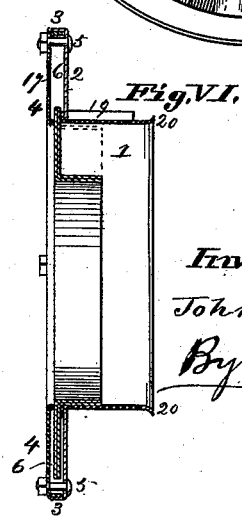
Fig. VI.
Attest:
C. Arthur
H. S. Knight
Inventor:
John E. Shaffer.
By Knight Bro.
Attys.

UNITED STATES PATENT OFFICE.

JOHN E. SHAFFER, OF OAK HILL, MISSOURI.

ROTARY ADJUSTABLE STOVE-PIPE THIMBLE.

SPECIFICATION forming part of Letters Patent No. 412,673, dated October 8, 1889.

Application filed March 8, 1889. Serial No. 302,447. (No model.)

*To all whom it may concern:*

Be it known that I, JOHN E. SHAFFER, of Oak Hill, in the county of Crawford and State of Missouri, have invented certain new and useful Improvements in Rotary Adjustable Stove-Pipe Thimbles, of which the following is a full, clear, and exact description, reference being had to the accompanying drawings, forming part of this specification.

This improvement has an expansible sleeve, whose flange consists of two series of overlapping wings that work in an annular recess of the flange that is flat against the wall around the stove-pipe hole therein.

Figure I is a front view of the device, showing the expanding sleeve at its utmost expansion. Fig. II is a similar view to Fig. I, except that the sleeve is contracted to its smallest diameter. Fig. III is a rear view, with the flue and inner plate of the flange removed; and Fig. IV is a similar view with parts as shown in Fig. II. Fig. V is a side view of the device with part in axial section. Fig. VI is an axial section at VI VI, Fig. I.

1 is a cylindrical flue, which is fixed in the stove-hole of the (brick) chimney.

2 is a flat ring or disk forming a flange on the outer end of the flue, the latter engaging the inner circumference of the flange, so as to allow the flange to turn freely on the flue without escaping therefrom. The outer circumference or edge of the flange is also turned in a cylindrical lip to engage with a similar lip 3 upon the edge of the flat ring or disk 4, which is parallel with the disk 2 and held thereto by rivets or bolts 5. Between the disks 2 and 4 is an annular space 6, in which works the flexible flange of the expanding sleeve or collar which surrounds the stove-pipe. This expanding sleeve or collar 7 has two curved strips of metal, which are secured flat together in the form of an open ring, whose ends may be brought close together to form a closed ring; or the ends may be separated more or less to form the arc of a ring of larger diameter. Thus the sleeve may be made to fit stove-pipes of any diameter within certain limits. Each of the curved strips forming the collar or sleeve 7 has radial wings 8 and 9, respectively, extending outward at right angles with the sleeve 7 and forming a flange thereon, which occupies the space 6, as before stated. The wings of each strip are preferably in the same piece with the strip, and, while they form an almost continuous flange at the strip, leave openings widening outwardly, which are covered by the wings of the other strip, the wings 8 covering the openings between wings 9, and vice versa. The wings slip upon each other as the sleeve is expanded or contracted. One end 10 of the sleeve 7 is riveted to the flue 1, while the other end 11 of the ring is attached to the flange 2 4 by means of a screw-bolt 12, passing through the flange 2 4 and the flange formed of the wings 8 9. This bolt has a thumb-nut 13, which may be used to press the disks 2 4 hard against the flange 8 9, to fix it in position and also to hold in place the cover by which the stove-hole opening 14 is closed in the absence of the stove-pipe. The cover is not shown, except by broken lines 15 in Figs. I and II. It may consist of a simple round disk, either flat or concavo-convex, or of any other shape; but the edge is suited for insertion between the inner edge of the disk 4 and the flange 8 9, where it is tightly held by screwing home the thumb-nut 13. Where it is desired to allow air to escape through the stove-pipe opening 14, the sleeve is expanded so as to leave a crescent-formed opening between the edge of the cover and the sleeve. (See Fig. I.) In order to hold the sleeve in position when the thumb-nut is loose, a screw 16 is fixed in one of the wings, as 8, and extends through an oblique slot 17 in the outer disk 4, where the bolt carries a thumb-nut 18, which may be screwed tight against the disk 4, for the purpose stated.

In the use of the device the flue 1 is fixed in the stove-hole of the house-chimney, with the disk 2 lying close against the wall, but not fixed thereto. The cover will be supposed to be in place, closing the stove-pipe hole 14, as indicated by dotted lines in Fig. II. If it is desired to allow air to escape from the room into the chimney, the thumb-nuts are both loosened, and the flange 2 4 is turned toward or into the position shown in Fig. I and the thumb-nuts screwed tight to hold the parts in this position.

When it is desired to insert the stove-pipe, the thumb-nut 13 is made loose and the cover removed, and after the stove-pipe is inserted the other thumb-nut is made loose and the sleeve made tight upon the stove-pipe by turning the flange 2 4 toward the position seen in Fig. II. The thumb-nuts are then made fast, and the stove-pipe will be tightly held. It will be seen that stove-pipes of all sizes will have their centers in the same vertical line, so as to be straight with the flanges 2 4. (See Figs. I, II, III, and IV.)

The screw 12 is firmly fixed in the flange-plate 2, as seen in Fig. V, by means of its head 12' and washer 12².

In order to hold the flue 1 firm in the chimney-wall, it is made with a longitudinal rib or flange 19, and has its edge turned out in a lip 20.

I claim as my invention—

1. The expanding sleeve 7, formed of two strips carrying radial rings 8 9, overlapping so as to form a close flange working in the recess of a flange surrounding the sleeve 7, for the purpose set forth.

2. The combination of the flue 1, the flange 2 4, turning on the flue and having an annular recess 6, and the expanding sleeve 7, with one end secured to the flue 1 and the other end secured to the turning flange 2 4, and carrying a flexible flange 8 9, working in the recess 6, substantially as and for the purpose set forth.

3. The combination of the flue 1, recessed flange 2 4, turning on the flue, expanding sleeve 7, with one end attached to the flue and having flexible flange 8 9, working in the recess of the turning flange 2 4, and screw-bolt passing through the flanges 2 4 and 8 9, and having a nut adapted to bear upon the outer face of the outer disk 4 of the turning flange, for the purpose set forth.

4. The combination of the flue 1, recessed flange 2 4, turning on the flue, expanding sleeve 7, with one end attached to the flue, and having a flexible flange composed of wings 8 9, working in the recess of the turning flange 2 4, screw-bolt passing through the flanges 2 4 and 8 9, with nut bearing against the outer disk 4 of the turning flange, and a screw-bolt fixed in a wing of the flange 8 9 and extending through an oblique slot of the disk 4, substantially as and for the purpose set forth.

JOHN E. SHAFFER.

In presence of—
 WILLIAM M. PALMER,
 JAS. G. RICHARDSON.